United States Patent
Pleasants et al.

[15] 3,700,192
[45] Oct. 24, 1972

[54] VORTEX BREECH HIGH PRESSURE GAS GENERATOR

[72] Inventors: James E. Pleasants; Viggo G. Dereng, Newport News, Va.

[73] Assignee: The United States of America as represented by the Administrator of the National Aeronautics and Space Administration

[22] Filed: Jan. 22, 1971

[21] Appl. No.: 108,824

[52] U.S. Cl. ................................... 244/139, 60/291
[51] Int. Cl. ............................................. B64d 17/72
[58] Field of Search ...244/139, 149; 102/39; 60/291; 89/101, 1 B

[56] References Cited
UNITED STATES PATENTS

| | | |
|---|---|---|
| 2,673,051 | 3/1954 | Frost ....................... 244/139 |
| 3,051,420 | 8/1962 | Novak ...................... 244/139 |
| 3,092,358 | 6/1963 | Potts et al. ............. 244/139 X |
| 3,107,887 | 10/1963 | Dixon et al. ............. 244/139 |
| 3,133,718 | 5/1964 | Stencel ................... 244/149 X |
| 3,251,566 | 5/1966 | Chappell ................. 244/149 X |

Primary Examiner—Milton Buchler
Assistant Examiner—Carl A. Rutledge
Attorney—Howard J. Osborn et al.

[57] ABSTRACT

A high pressure gas generator for ejecting parachutes or the like where propellant free gases are essential to prevent damage to the ejected article and employing a vortex breech to separate unburned propellant particles from the hot high pressure gases.

14 Claims, 5 Drawing Figures

PATENTED OCT 24 1972  3,700,192

INVENTORS
JAMES E. PLEASANTS
VIGGO G. DERENG
BY
Howard J Osborn
Wallace J Nelson
ATTORNEYS INVENTORS
JAMES E. PLEASANTS
VIGGO G. DERENG
BY
Howard J Osborn
Wallace J Nelson
ATTORNEYS

3,700,192

VORTEX BREECH HIGH PRESSURE GAS GENERATOR

ORIGIN OF THE INVENTION

This invention was made by employees of the National Aeronautics and Space Administration and may be manufactured and used by or for the Government of the United States without the payment of any royalties thereon or therefor.

DESCRIPTION OF THE INVENTION

This invention relates generally to a high pressure gas generator and relates in particular to a system for generating solid-free high pressure gases to eject a parachute or the like from a vehicle for deceleration thereof after an aerial or space flight.

One problem that has been encountered in employing solid propellant gas generators for ejecting parachutes and the like has been the tendency of the solid propellants to expel burning or unburned solid particles of such velocity as to damage the parachute being ejected. One solution to this problem has been to employ a grill work to hold the propellant particles in the cartridge until they have ignited and burned to a size sufficiently small to traverse the grill or to design the gas generating cartridge in such manner that all particles are ignited upon initial ignition of the cartridge.

Both of these solutions depend upon igniting all the solid propellant particles at an early time. This is difficult, if not impossible, to accomplish with consistency and non-linear pressure-time curves are normally attained. In addition, the grills fail physically, change dimensionally and permit burning particles to exit the cartridge resulting, sometimes, in burn damage to the parachute. Unsymmetrical erosion patterns have also occurred in the exit orifice due to abrasions by burning or unburned particles.

It is therefore an object of the present invention to provide a solid propellant gas generator that produces high pressure gases free of solid particles.

It is a further object of the present invention to provide a new and novel apparatus for expelling parachutes or the like from a vehicle.

A further object of the present invention is a novel gas generator for generating high pressure gases free of hot solid particles.

Another object of the present invention is a novel system for utilizing all the solid particles in a solid propellant gas generator.

An additional object of the present invention is a gas generator producing a pressure rise rate linear over the entire rise and with a repeatable slope.

Another object of the present invention is a gas generator that enhances repeatability of peak pressure.

Another object of the present invention is a gas generator wherein poor cartridge design is minimized.

Another object of the present invention is a gas generator consistent in performance over a wide temperature range.

Yet another object of the present invention is a gas generator that produces a symmetrical and repeatable erosion pattern at the orifice entry.

According to the present invention the foregoing and other objects are attained by providing a system for ejecting a parachute wherein an electrically actuated initiator ignites a booster charge in a stem contained within a tubular solid gas generating charge. The force of the pressure of the generated gases causes the solid propellant charge particles to be accelerated to a high velocity upon exit from the propellant cartridge. A deflector plate extending from the propellant into a spherical chamber provides a tangential velocity to the propellant gases as they enter the breech. During this swirling motion separation of the unburned particles and the gases occurs. The unburned particles have a higher mass and centrifugal force than the gas particles and thus retain a peripheral orbit within the spherical breech while the lighter gas particles move to the center of the breech volume due to the increase in pressure within the breech across the breech radius. The unburn solid particles swirl and mix to enhance flame propagation and burning. The gases are forced out of the breech through an orifice, by the pressure differential, on an axis perpendicular to the plane of rotation of the particles within the breech. This orifice leads to a nozzle adjacent a deployment tube containing the parachute, or the like, to be ejected.

The deployment system consists of a parachute and its attachments packed in a deployment tube with the breech and cartridge assembly in fluid communication with the deployment tube via a nozzle. Upon initiation, the cartridge generates high pressure and high temperature gas. The gas flow to the tube is controlled by an eroding orifice which causes the pressure level acting on the sabot in the tube to rise at such a rate as to sever the shear pins restraining the cover and accelerate the pack to the required muzzle velocity. The sabot is thrown to the side by the bridle lines becoming taut. The outgoing pack breaks the lines restraining the stowed bridle. The parachute is pulled from its storage bag as it regresses from the tube and the bag and cover remain attached to the top of the parachute as it inflates to decelerate the spacecraft.

A more complete appreciation of the invention and many of the attendant advantages thereof will be readily apparent as the same becomes better understood by reference to the following detailed description when considered in connection with the accompanying drawings wherein.

Figure 1:
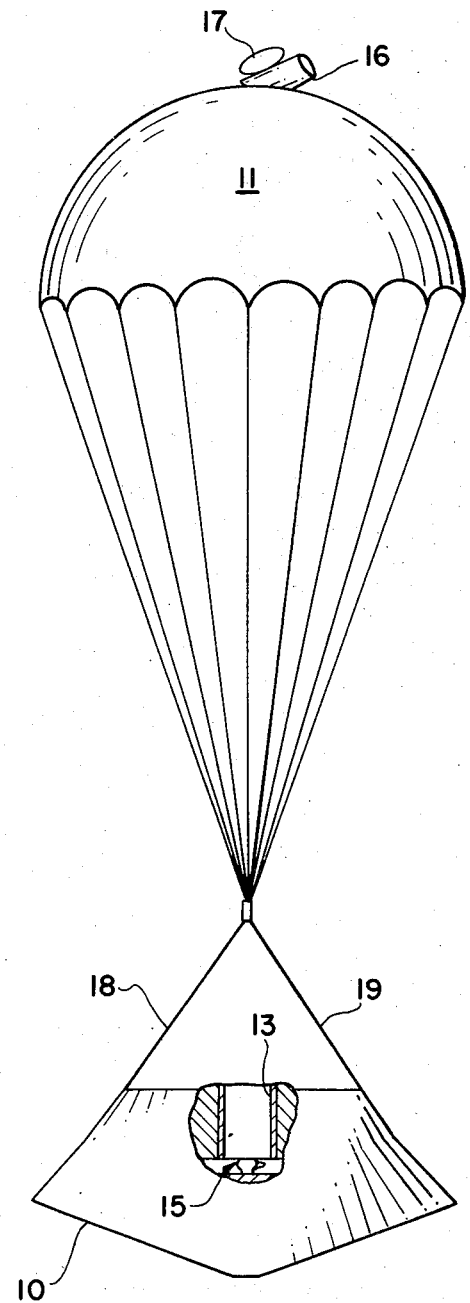
FIG. 1 is a view of a space vehicle employing a gas generator according to the present invention and after ejection of the decelerator parachute.

Referring now to the drawings, wherein like reference numerals designate identical parts throughout the several views, and more particularly to FIG. 1, there is shown a space vehicle 10 descending after space flight under the decelerating influence of a parachute 11. The upper structure of vehicle 10 serves as a housing for deployment tube 13 which houses parachute 11 until deployment, as will be further explained hereinafter. A gas generator for ejecting parachute 11 is disposed adjacent tube 13 and generally designated by reference numeral 15. The storage bag initially containing parachute 11 and the cover for tube 13 remain attached to parachute 11 and are designated respectively by reference numerals 16 and 17. Parachute 11 is attached to vehicle 10 by suitable bridle lines, two of which are shown and designated by reference numerals 18 and 19.

Figure 2:
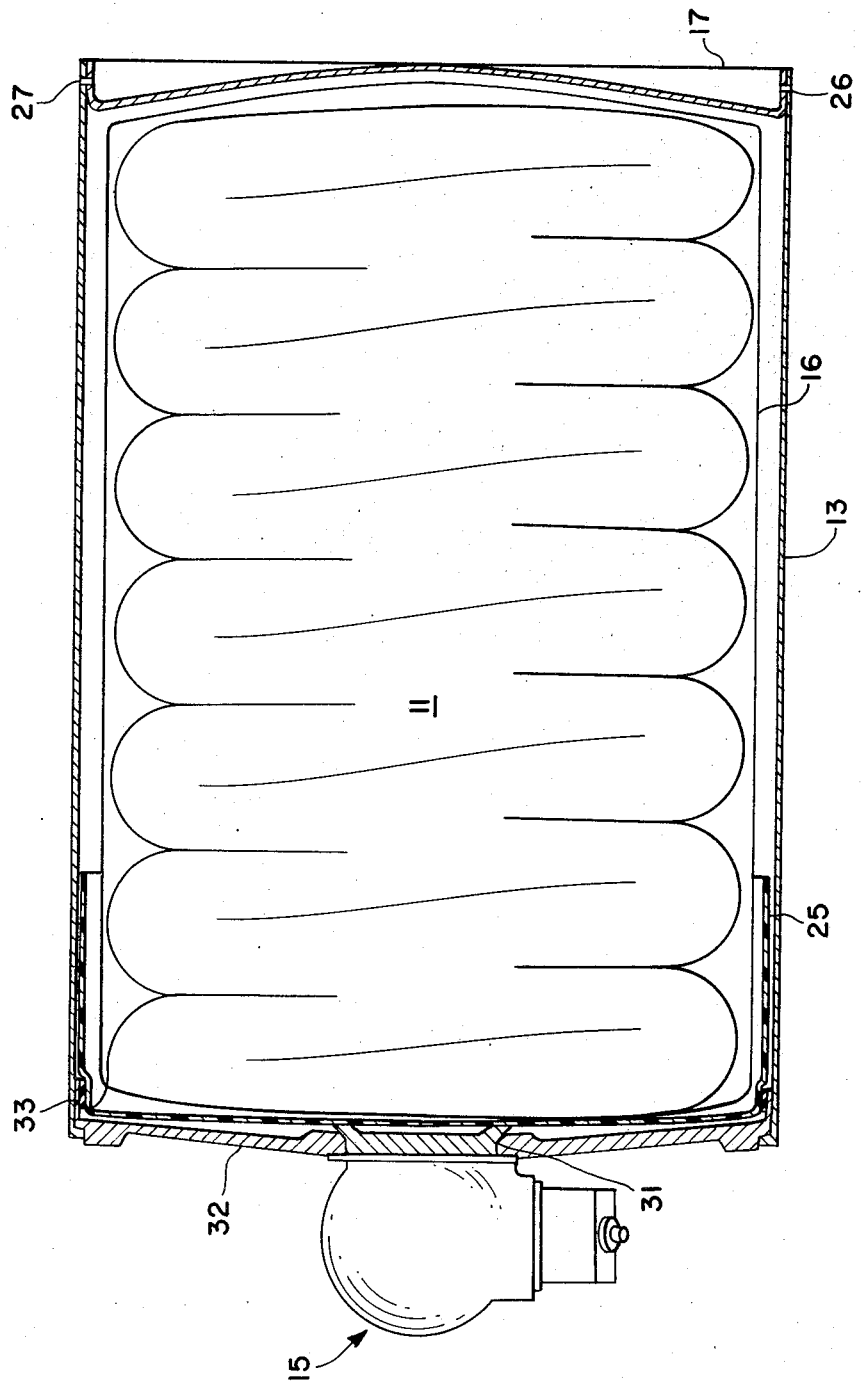
FIG. 2 is a view partially in section of the gas generator and parachute deployment tube shown in FIG. 1.

Referring now more particularly to FIG. 2, it is seen that parachute 11 is initially stored in bag 16 disposed within tube 13. Bag 16 and its contents are retained within the tube 13 between sabot 25 and cover 17. A plurality of shear pins, two of which are shown and designated by reference numerals 26 and 27, hold cover 17 in position until the gases generated by gas generator 15 force the shearing thereof. The nozzle 31 of gas generator 15 extends through a base plate 32 which serves to close tube 13 and also serves as the attachment for deployment tube 13 within the body of vehicle 10. Nozzle 31 opens into tube 13 adjacent the closed end of cup-shaped sabot 25. A suitable chevron seal 33 is snugly fitted about sabot 25 to maintain a gas seal between sabot 25 and tube 13 as the expanding gases force the sabot away from base plate 32.

Figure 3:
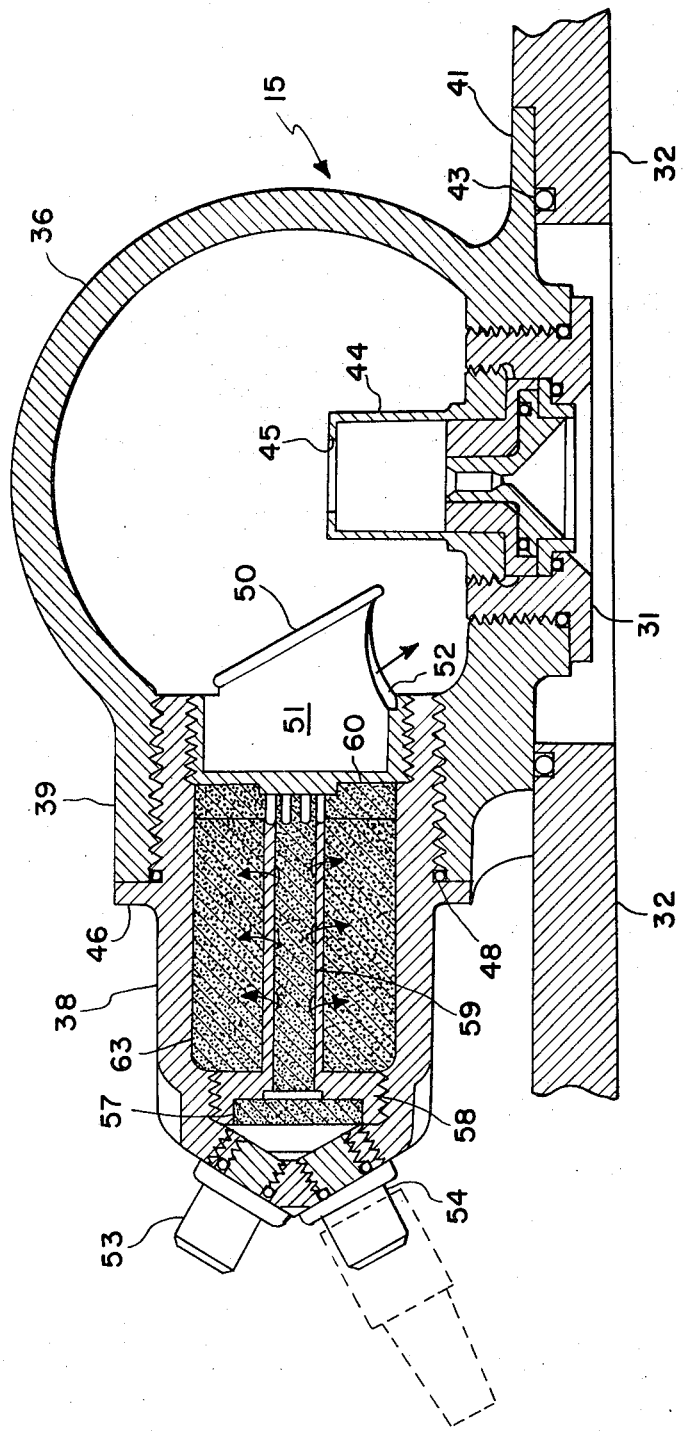
FIG. 3 is a section of one embodiment of the gas generator shown in FIGS. 1 and 2 with the vortex generator deflector plate therein being rotated 90° out of operative position for purposes of illustration.

Referring now more particularly to FIG. 3, the details of one embodiment of gas generator 15 will now be described. Gas generator 15 is formed of three general parts, an essentially spherical breech 36, a nozzle 31 and a cartridge 38. Nozzle 31 serves to expand and direct the gases from generator 15 through an opening in base plate 32 toward sabot 25 (FIG. 2). A retainer ring 41 is formed integral with breech 36 so as to surround nozzle 31 and serve as attachment mechanism for generator 15 with the base plate 32. A plurality of bolts, or the like, not shown, pass through ring 41 and engage base plate 32 to form a rigid connection of generator 15 to base plate 32. A suitable chevron seal 43 insures a gas-tight connection between these parts. A collector tube 44 is attached to nozzle 31 and extends into the chamber formed in breech 36. Collector tube 44 is provided with a single opening at the end thereof which extends substantially to the center of breech 36. This single opening permits free flow of the lighter gases that are pressure forced toward the center of breech 36 while impeding the flow of the heavier solid combustion particles, as will be further explained hereinafter.

Cartridge 38 is threadingly received by breech 36 at essentially 90° along the circumference of breech 36 from nozzle 31. A circular ring 46 is formed integral on cartridge 38 and adapted to abut against a shoulder 47 extending from the spherical portion of breech 36. A suitable chevron seal 48 is disposed between ring 46 and shoulder 47 to insure a gas-tight connection between the parts. A circular deflector plate 50 is integrally attached to a short tubular member 51 extending from cartridge 38 into the breech chamber. Tubular member 51 is provided with a single opening in the sidewall thereof beneath deflector plate 50 to permit the escape of gases therefrom. The gases passing through this opening is deflected toward the periphery of the breech chamber by the canted position of deflector plate 50. This deflector plate 50 is shown in FIG. 3 rotated 90° out of operative position for purposes of illustration. Thus, in operative position the deflector 50 would direct the gases from cartridge 38 in a circular path along a plane perpendicular to the axis of nozzle 31.

Cartridge 38 is provided with a pair of electrically actuated initiators 53 and 54 for reliability. Each initiator is capable of igniting the gas generator 15 and each is directed toward a disk of ignition powder 57 disposed within one end of perforated transfer tube 58. An ignition booster charge 59 fills the length of perforated transfer tube 58. The other end of transfer tube 58 is received by a centrally perforated disk ignition booster charge 60. One face of charge 60 abuts tubular member 51 while the other face abuts a tubular gas generating solid propellant charge 63.

Figure 4:
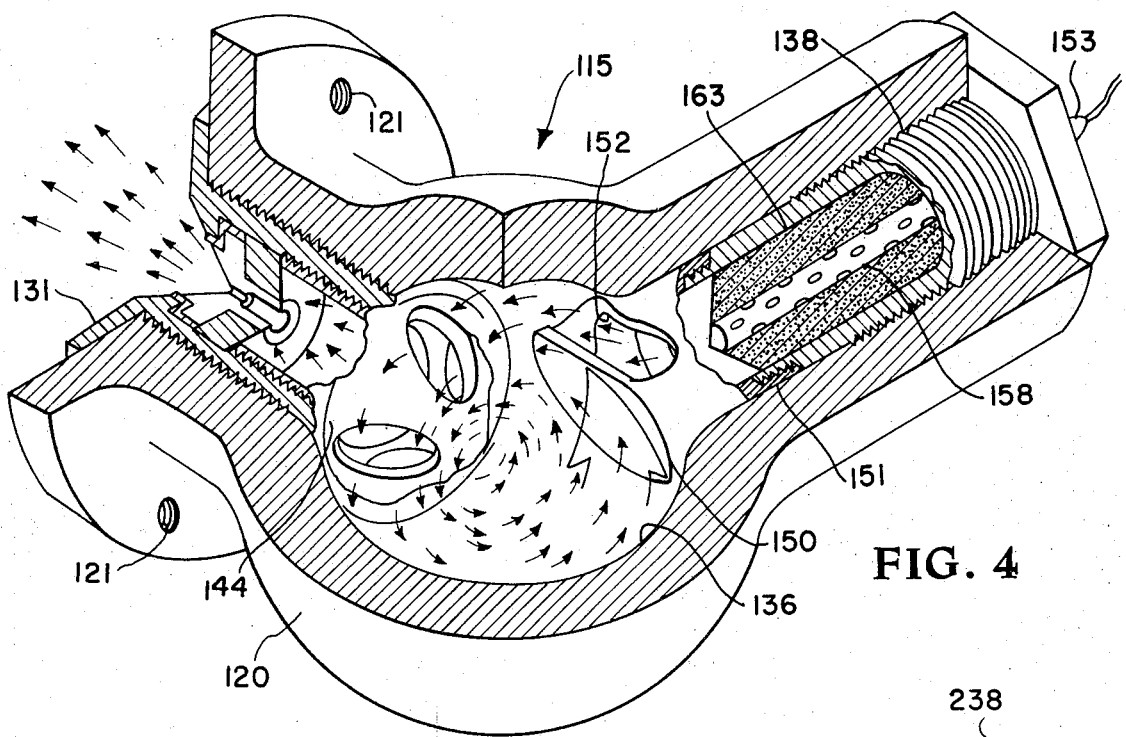
FIG. 4 is a part section of a second embodiment of the gas generator of the present invention.

Referring now to FIG. 4, a slight modification of the gas generator of the present invention is shown and generally designated by reference numeral 115. In this embodiment a unitary shell 120 forms the breech, housing for nozzle and housing for the cartridge. Suitable openings 121 are provided in shell 120 for attachment bolts, or the like, to connect generator 115 to a base plate, not shown. A single initiator 153 is connected to a threaded cartridge 138 received within housing 120. Cartridge 138 includes an elongated perforated transfer tube 158 positioned within a tubular gas generating propellant charge 163. Suitable ignition charges, not shown, are also employed in this embodiment adjacent the ends of propellant charge 163 and in transfer tube 158. As in the embodiment previously described, a tubular gas conduit 151 extends from one end of propellant charge 163 into the breech chamber 136. Conduit 151 is provided with a deflector plate 150 canted at an angle such that the gases passing through conduit 151 exit, against the deflector plate 150 through opening 152 in such manner that a spiral motion is imparted to the gas particles. That is, the gases are deflected by the deflector plate 150 against the spherical wall of breech 136 and the velocity of the gas particles causes them to undergo a spiral motion. Thus, the centrifugal force of any solid unburned or burning particles would cause these particles to remain along the periphery of breech 136 while the expanding gases would force the lighter gas particles toward the retainer 144 adjacent nozzle 131. Nozzle 131 is formed of a threaded insert positioned within the gas generator 115 and exits from breech 136 substantially 90° from the entrance of conduit 151 into the breech. In the illustration shown in FIG. 4, deflector plate 150 is shown in operative position. That is, the deflector plate 150 directs the gas particles along an arc taken on a plane perpendicular to the nozzle exit.

Figure 5:
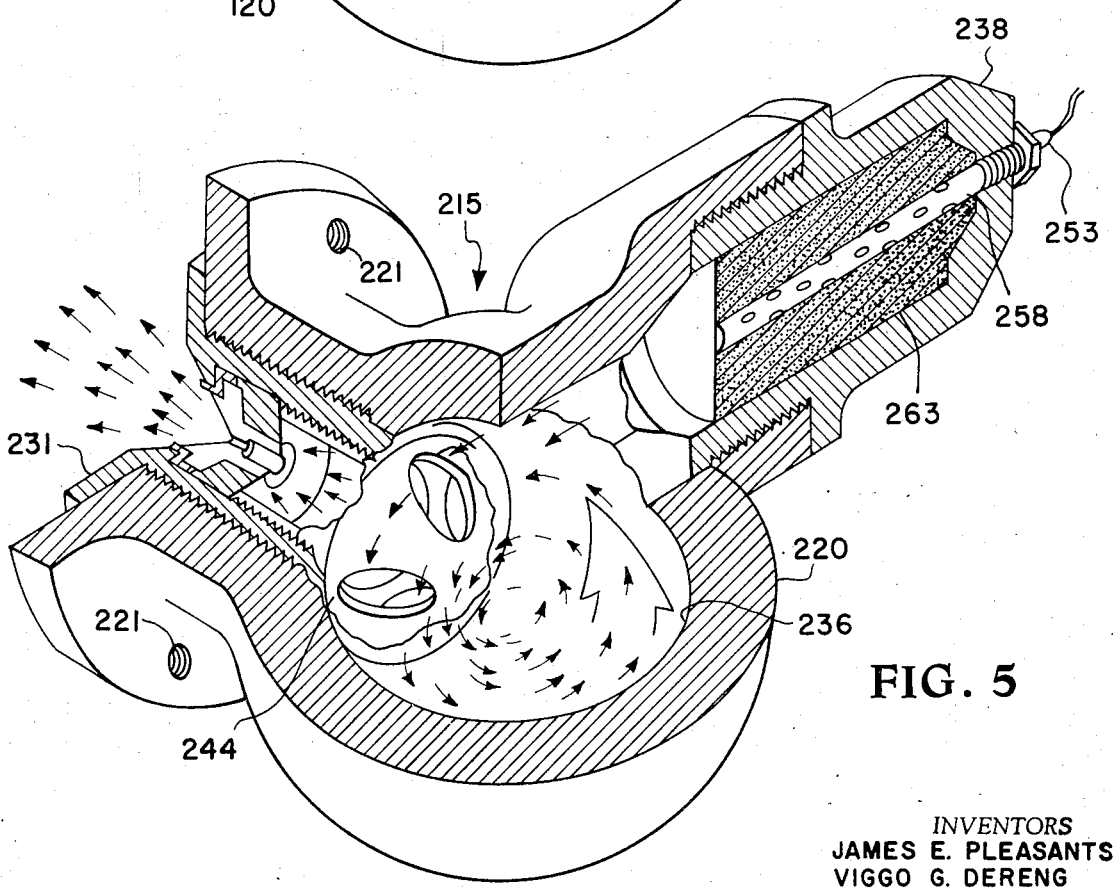
FIG. 5 is a part section of another embodiment of the gas generator of the present invention.

Referring now to FIG. 5, an additional modification of the gas generator of the present invention is shown and designated by reference numeral 215. As in the previously described embodiment a unitary shell 220 forms the breech 236, housing for nozzle 231, and housing to receive the cartridge 238. Suitable openings 221 are provided in the base of shell 220 to receive bolts or the like to connect generator 215 to a base plate, not shown. In this embodiment, no separate conduit and deflector plate are employed to impart a spiral motion to the gases entering breech 236. Instead, the entry for cartridge 238 into breech 236 is positioned on the periphery of the spherical breech such that the gases entering the breech will, by their velocity, be accelerated about the breech periphery on a plane substantially perpendicular to the nozzle exit guarded by retainer 244. A single initiator 253 is also employed in this embodiment to ignite ignition booster charges, not shown, disposed at the ends of solid propellant gas generating charge 263 and within perforated transfer tube 258.

OPERATION

The operation of the invention is now believed apparent. When it is desired to decelerate vehicle 10 (FIG. 1) for landing after a space flight, the initiators 53 and 54 (FIG. 3) are actuated by a suitable radio signal or the like in a conventional manner. These initiators cause ignition of ignition disk 57 which transfers ignition flame to the ignition booster charge 59 in transfer tube 58 and ignition disk 60. The flame from the ignition charges serve to ignite solid propellant gas generating charge 63 along its internal diameter and at the end thereof. This is accomplished by flame spreading through the perforations along the length of transfer tube 58 and by the contact of charge 59 with disk 60 and complete ignition of charge 59 occurs almost instantaneously. The gases produced by charge 59 pass rapidly through tubular conduit 51 and impinge against deflector plate 50 where the particles are deflected against the periphery of breech 36. As mentioned hereinbefore deflector plate 50 is shown in FIG. 3 rotated 90° out of its operative position for purposes of illustration. The motion of the gas particles deflected by deflector plate 50 will be in a plane perpendicular to the exit nozzle 31. This construction provides for the centrifugal forces of the burning or unburned propellant particles to maintain these heavier particles adjacent the breech periphery while the lighter gas particles will escape through nozzle 31. That is, the force of the pressure of the generated gases causes the propellant particles to be accelerated to a high velocity upon exit from cartridge 38. The deflected entry provided by deflector plate 50 provides a tangential velocity by the restraint of the interior wall of breech 36 causing the particles to rotate in a plane perpendicular to the exit nozzle. During this rotation or swirling motion, separation of the gases and unburned particles occurs. The unburned particles have a higher mass and centrifugal force and retain a peripheral orbit and the lighter gas particles, with a lower mass and centrifugal force, are moved to the center of the breech volume and enter collector tube 44. The unburned or burning particles swirl and mix enhancing flame propagation and, consequently, burning. The gases are forced out of breech 36 through opening 45 in collector tube 44 by the pressure differential and on an axis perpendicular to the plane of rotation. The tubular construction of collector 44 is an additional safety feature that retards movement of any solid burning or unburning particle toward nozzle 31. Additionally, any residual solid ash particles tend to collect at the exterior base of collector tube 44 and do not enter nozzle 31. Gases passing through nozzle 31 impinge against sabot 25 within tube 13 (FIG. 2) and force the sabot to push the deployment tube contents therefrom. This is accomplished by causing the pressure level in tube 13 to rise to such a level as to shear pins 26, 27 and others, not shown, that restrain the cover 17. The tube contents are then accelerated to the required muzzle velocity and sabot 25 is thrown to the side by the parachute bridle lines becoming taut. Storage bag 16 is stripped off the extending parachute 11 as it regresses from tube 13. The bag 16 and cover 17 are tied to and remain on top of parachute 11. The parachute 11 then inflates and serves to decelerate vehicle 10 to its landing speed.

The operation of the embodiments shown in FIGS. 4 and 5 are substantially identical to that described for FIG. 3. Essentially the only difference is in the housing and that the embodiments of FIGS. 4 and 5 employ only one initiator. Also, peripheral entry is employed in lieu of a deflector plate in the embodiment of FIG. 5.

The advantages of the present invention over prior art gas generators are now believed apparent. Specifically, the propellant particles are all consumed within the breech to eliminate possible burn damage. This is attained due to the dwell time of the propellant particles within the vortex breech being increased and by more thorough mixing to thereby enhance complete combustion. The pressure rise rate is also linear over the entire rise and has a repeatable slope. This linear, repeatable wave is indicative of high reliability. The deflector plate employed in the present invention is inherently stronger than any grill that could be employed to retain solid particles and erosion patterns at the orifice entry is symmetrical and repeatable.

No specific ignition powder or gas producing propellant charge have been described, it being understood that various conventional compositions of these powders would be applicable to the present invention. Also, no specific materials for making the components have been described as these may vary according to the uses of the present invention, it being understood that the pressure in the plenum chamber can be as great as 20,000 psi and this reached essentially linearly within 0.004 seconds after ignition. Although the breech shown and described herein is spherical in shape, this is for illustrative purposes only and is not intended to be limiting on the invention, it being understood that elliptical and cylindrical shaped breeches are equally applicable for the vortex breech principle of the present invention.

Obviously, there are many other modifications and variations of the present invention possible in the light of the above teachings that will be readily apparent to those skilled in the art. It is therefore to be understood that within the scope of the appended claims the invention may be practiced otherwise than as specifically described.

What is claimed as new and desired to be secured by Letters Patent of the United States is:

1. Apparatus for providing a supply of high pressure hot gases free of burning propellant particles comprising:
   a cartridge housing a propellant charge and an initiator for said charge,
   a breech having a circular peripheral interior for receiving the hot gases emanating from said charge when said charge is ignited by said initiator,
   means for imparting a circular motion to the hot gases received into said breech, and
   exit means for said hot gases tangentially disposed in said breech relative to said propellant charge.

2. The apparatus of claim 1 wherein said means for imparting a circular motion to the hot gases comprises a deflector plate disposed between said charge and said chamber so as to deflect the hot gases against the circular interior of said breech.

3. The apparatus of claim 1 wherein said means for imparting a circular motion to the hot gases comprises an entrance port leading into said chamber from said charge and so constructed and arranged as to direct the gases received thereby against the periphery of said chamber.

4. The apparatus of claim 1 including a perforated retainer disposed in said spherical chamber adjacent said exit means to permit the flow of expanding gases therethrough while retaining any solid propellant particles within said chamber.

5. The apparatus of claim 1 including a collector tube extending into said breech to substantially the center thereof and being provided with a single opening therethrough for the passage of the expanding gases from the center of said breech to said exit means.

6. The apparatus of claim 1 wherein said exit means includes a nozzle and a collector tube integral with said nozzle, said collector tube extending within and substantially to the center of said breech, said collector tube serving to permit free flow of expanded gases while impeding the flow of solid combustion products therethrough.

7. A system for decelerating a space vehicle after a space flight comprising:
 a parachute and a gas generator for releasing said parachute,
 a tubular deployment chamber for said parachute formed in said vehicle,
 cover means retaining said parachute in said tubular deployment chamber,
 a sabot positioned at one end of said tubular deployment chamber,
 a nozzle for said gas generator directed toward said sabot and received by said tubular deployment chamber,
 a spherical breech for said gas generator and in fluid communication with said nozzle, and
 a solid propellant gas generating charge in fluid communication with said spherical breech.

8. The system of claim 7 including a storage bag containing said parachute and disposed between said sabot and said cover means, a plurality of shear pins serving to maintain said cover in position retaining said parachute in said tubular deployment chamber until the gas pressure received in said chamber against said sabot exceeds the design load of said pins.

9. The system of claim 7 including seal means positioned about said sabot to prevent gas leakage between said sabot and said tubular deployment chamber during deployment of said parachute.

10. The system of claim 7 including means for directing the gases produced by said gas generating charge in a circular motion within said spherical breech and wherein the exit for said nozzle is substantially perpendicular to a plane taken through the plane of circular motion of said gases.

11. The system of claim 10 wherein said means for directing the gases produced by said gas generating charge in a circular motion includes a tubular conduit leading from said gas generating charge into said breech and a canted deflector plate disposed on said tubular conduit for deflecting the gases toward the periphery of said spherical breech.

12. The system of claim 11 wherein said means for directing the gases produced by said gas generating charge in a circular motion includes an opening from said gas generating charge into said spherical breech directed toward the periphery of said breech and on an arc spaced from said nozzle such that the motion of said gas particles as received from said gas generating charge is substantially on a plane perpendicular to said nozzle.

13. The system as in claim 10 wherein said gas generating charge is a solid tubular charge having a perforated tubular transfer stem extending therethrough and ignition booster means disposed at each end and within said tubular transfer stem.

14. The system as in claim 10 including a collector tube extending inwardly from said nozzle to substantially the center of said breech, said collector tube serving to permit free flow of expanded gases while impeding the flow of solid combustion products therethrough.

* * * * *